United States Patent [19]
Furneaux

[11] Patent Number: 5,890,637
[45] Date of Patent: Apr. 6, 1999

[54] PET LEASH MULTI-PURPOSE UTILITY BAG

[76] Inventor: Lloyd Furneaux, 480 Milton Road, Kelowna, British Columbia, Canada, V1X 6H8

[21] Appl. No.: 876,218
[22] Filed: Jun. 16, 1997
[51] Int. Cl.$^6$ ....................................................... A45F 5/00
[52] U.S. Cl. ............................ 224/191; 224/682; 224/236
[58] Field of Search ..................................... 224/191, 682, 224/683, 235, 236, 241, 684, 931

[56] References Cited

U.S. PATENT DOCUMENTS

| | | | |
|---|---|---|---|
| 1,194,335 | 8/1916 | Jennings | 224/682 |
| 3,552,610 | 1/1971 | Coleman et al. | 224/931 |
| 4,790,463 | 12/1988 | Hansen | 224/682 |
| 4,801,059 | 1/1989 | Hayes | 224/236 |
| 5,409,153 | 4/1995 | Ristich | 224/236 |
| 5,441,017 | 8/1995 | Lindsay | 119/795 |
| 5,577,653 | 11/1996 | Bieker | 224/684 |

Primary Examiner—David J. Walczak
Attorney, Agent, or Firm—Antony C. Edwards

[57] ABSTRACT

A utility bag has an elongate flexible sleeve having an upper end and a lower end and front and back sides extending between the upper and lower ends, the upper end having a first aperture therein for access to a first cavity defined by the front and back sides and the lower end whereby articles may be placed through the first aperture into and removed from the first cavity, a flexible releasably securable flap provided at the first end of the sleeve for releasable closure of the first aperture. At least one flexible expandable pocket is mounted externally to the front side of the sleeve and expandable by pleating, whereby access may be had to a second cavity within the expandable pocket when the first cavity is full of material being carried and the sleeve is thereby firmly cylindrical, the first and second cavities for storing small articles therein, the expandable pocket having thereon a second releasably securable flap for releasably closing a second aperture for access to the second cavity, mounting straps at the upper and lower ends of the sleeve for releasable mounting of the utility bag to an elongate member, such as a pet leash.

6 Claims, 3 Drawing Sheets

PET LEASH MULTI-PURPOSE UTILITY BAG

FIELD OF THE INVENTION

This invention relates to the field of portable flexible receptacles, namely, small flexible bags which may be conveniently carried by a pet owner when walking a pet.

BACKGROUND OF THE INVENTION

Many cities have by-laws requiring dog owners to clean up after their pets. Thus, in order to avoid possible fines, it is advantageous that a dog owner keep plastic bags to hand.

In the prior art addressing this problem, applicant is aware of U.S. Pat. No. 5,441,017 which issued to Lindsay on Aug. 15, 1995. Lindsay discloses a cylindrical dispenser for dispensing plastic bags from a roll, the cylinder mountable to a pet leash. The cylinder may be rigid or may be flexible. Although, Lindsay teaches that the dispenser is flexible, it is likely that the dispenser would be sewn integrally with the line portion of the leash, apparently to overcome the stated disadvantage that the bags from the roll of bags held in the dispenser would not dispense quite as easily from a flexible cylinder and would not provide as good a handle as a rigid cylinder. The structure of Lindsay is dictated by the cylindrical roll of bags he teaches vending from the bag dispenser. Thus, the dispenser, if flexible, is integral with the leash in an attempt to make the dispensing structure semi-rigid.

SUMMARY OF THE INVENTION

The multi-purpose utility bag of the present invention, for carrying items advantageously carried while walking a pet, releasably attaches to all types of dog leashes, plus other pet related objects one would commonly use when walking a dog, such as a pet collar. The utility bag has a primary carrying compartment and at least one external separate expandable pocket, for example, expandable by pleating. Thus the utility bag can carry useful items when walking a pet, for example, medications, bee sting kits, dog treats, a dog training collar, plastic bags (preferably biodegradable), a plastic water bottle, a small dog toy for use in tracking, first aid supplies, car keys, money, etc. It is an object of the invention that recycled bags, such as plastic grocery store bags be carried in the primary compartment, rather than having to buy rolls of bags as contemplated by the Lindsay reference.

The expandable pocket allows carrying of additional small items even when the utility bag primary compartment is stuffed full. The utility bag attaches to standard inelastic dog leashes, retractable dog leashes, pet collars, belts, belt loops, purses, other bags, etc. It may be attached to a leash handgrip. It does not form part of the handgrip, but rather, an unobtrusive, loosely mounted, convenient accessory.

The fact that the utility bag is flexible, preferably of nylon-like material or the like, means that the utility bag may be folded and carried in a jacket or pants pocket when not in use. It also means that the bag will interfere less than a rigid container would with the use of a leash or be more easily clipped to a collar or belt because the utility bag, even when full, such as fill of plastic bags, may conform or bend as required. The expandable pocket, were it not expandable by pleating or the like, would not be useful when the primary compartment was full. Thus, it is an object of the present invention to provide an expandable pocket that may be usefully employed when the primary compartment is full of plastic bags.

In summary, the utility bag of the present invention is an elongate flexible sleeve having an upper end and a lower end, and front and back sides extending between the upper and lower ends. The upper end has a first aperture therein for access to a first cavity defined by the front and back sides and the lower end whereby articles may be placed through the first aperture into and removed from the first cavity. A flexible releasably securable flap is provided at the first end of the sleeve for releasable closure of the first aperture. At least one flexible expandable pocket is mounted externally to the front side of the sleeve. The expandable pocket is expandable by pleating or other pocket expansion means, whereby access may be had to a second cavity within the expandable pocket when the first cavity is full of material being carried and the sleeve is thereby firmly cylindrical. The first and second cavities provide for storing small articles therein. The expandable pocket has associated with it a second releasably securable flap for releasably closing a second aperture for access to the second cavity.

Mounting straps or other mounting means are provided at the upper and lower ends of the sleeve for releasable mounting of the utility bag to an elongate member, such as a pet leash.

DETAILED DESCRIPTION OF THE PREFERRED EMBODIMENT

Figure 3:
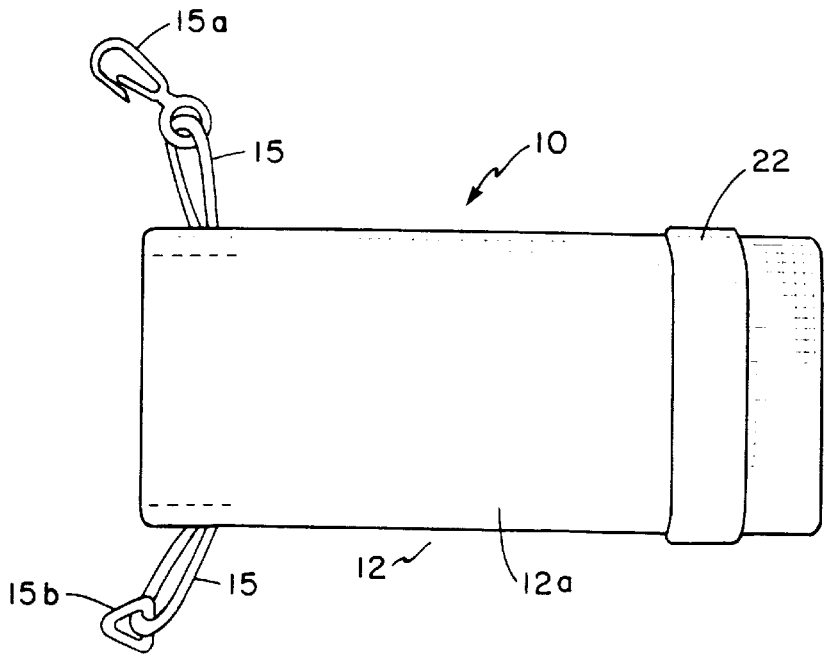
FIG. 3 is, in bottom plan view, the multi-purpose utility bag of FIG. 1.
Figure 1:
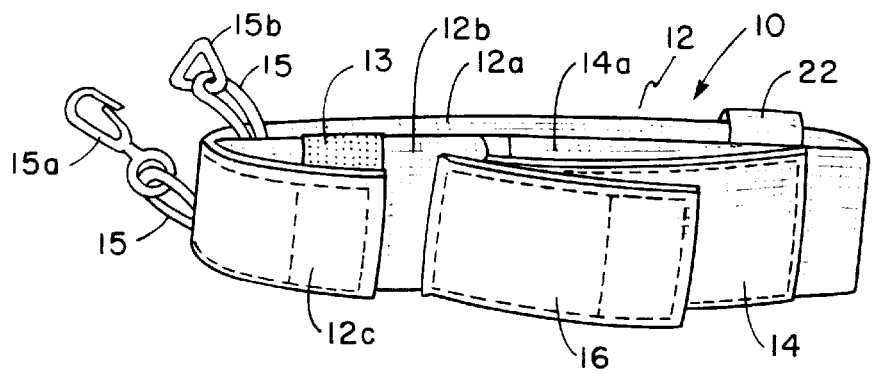
FIGS. 1 and 4a, are in perspective views, the multi-purpose utility bag of the present invention.
Figure 2:
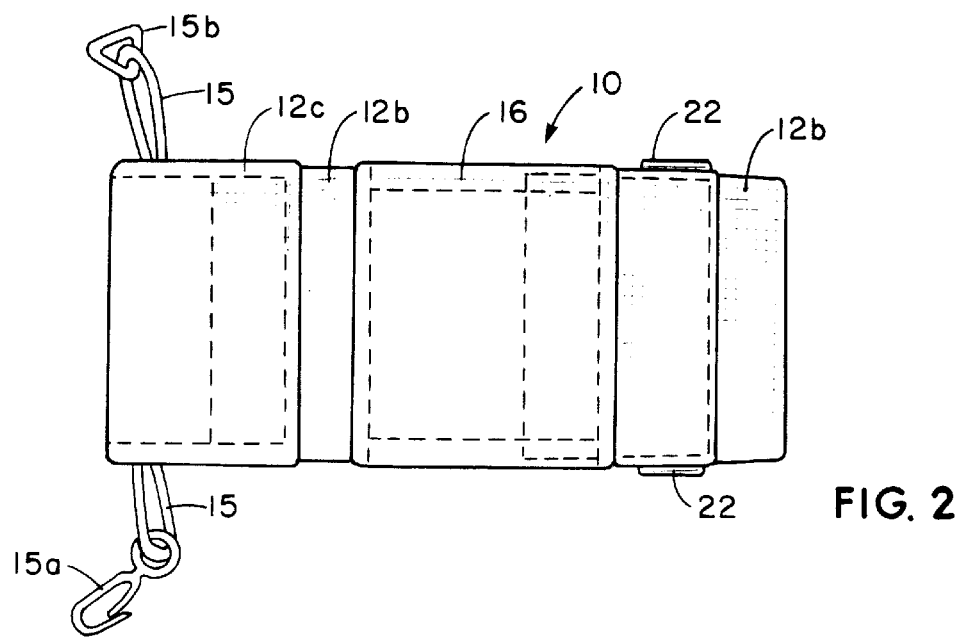
FIG. 2 is, in plan view, the multi-purpose utility bag of FIG. 1.

As illustrated in the accompanying Figures and, in particular, in FIGS. 1–4, the multi-purpose utility bag 10 of the present invention has a primary compartment within flexible sleeve 12. Sleeve 12 forms a large pocket running the full longitudinal length of utility bag 10 and which is generally cylindrical in shape when full. Sleeve 12 may be constructed by sewing opposed rectangular sheets 12a and 12b together around their edges. Sheet 12a may be longer than sheet 12b so as to form a flap 12c at an open end of sleeve 12, the opposite end sewn closed to complete the pocket. Flap 12c provides for releasable closing of the opening to sleeve 12. Releasable closure of flap 12c may be accomplished by releasable fasteners 13 such as Velcro® hook and loop fasteners, snaps, buttons or the like.

At least one smaller expandable pocket 14 having pleats 14a along its longitudinal sides, is mounted, as by sewing, over sheet 12b. Pleats 14a may along one edge thereof be secured by sewing between or into the seam between sheets 12a and 12b. Pleats 14a allow pocket 14 to be expandable outwards from sheet 12b on sleeve 12, even when sleeve 12 is full, that is, is cylindrical in shape. A smaller closure flap 16 is provided for releasable closure of pocket 14 and, again, may be releasably fastened by Velcro® fasteners or the like.

Flexible loops 15 are fastened to sleeve 12, for example, by means of sewing the ends of the loops into the seams between sheets 12a and 12b, at the uppermost end of sleeve 12. A nylon snap ring 15a is mounted to the free end of one of loops 15 for releasable fastening of snap ring 15a onto nylon ring 15b mounted on the free end of the opposite loop 15, that is, the loop 15 on the opposite side of the uppermost end of sleeve 12.

Figures 4, 4A:
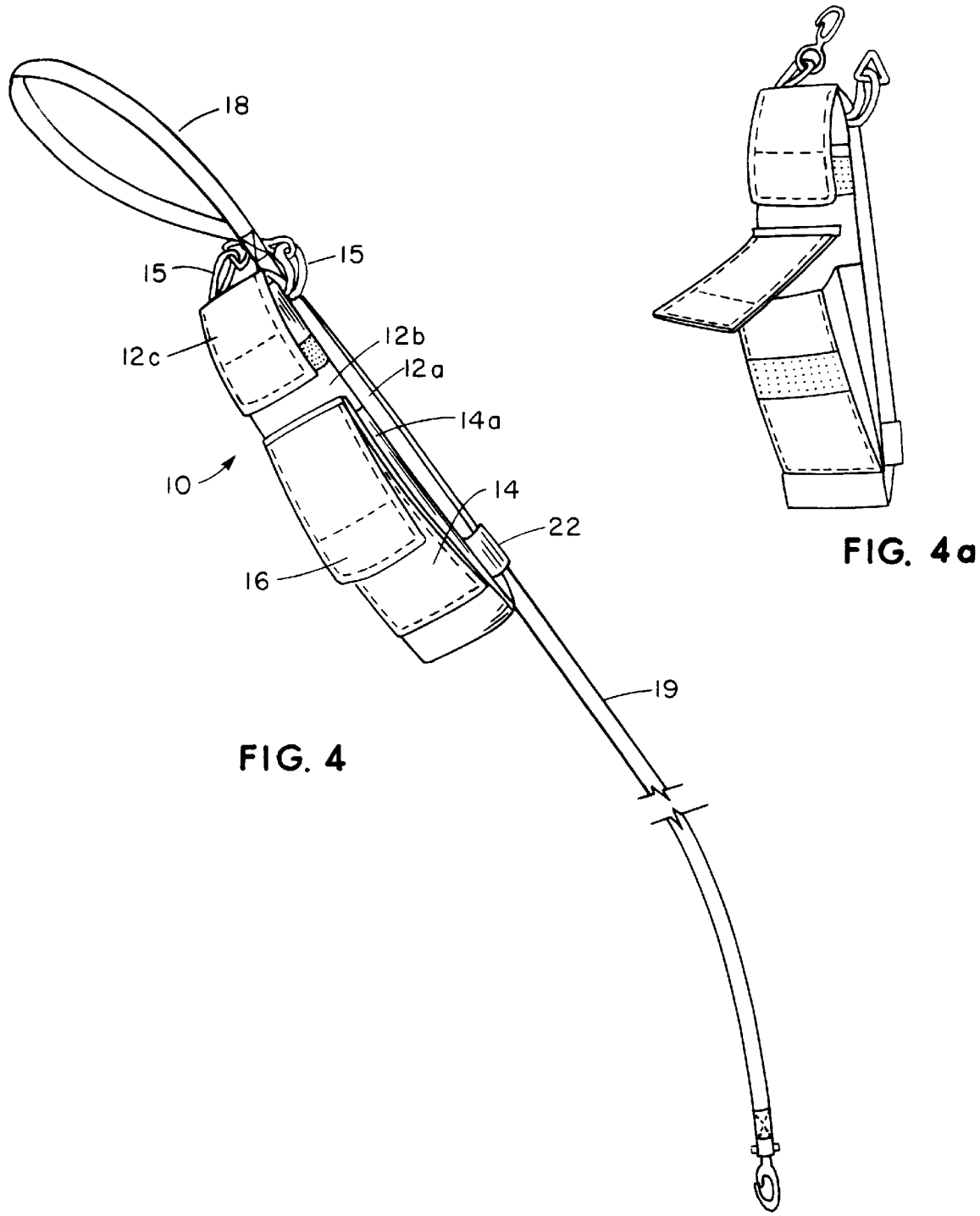
FIG. 4 is, in perspective view, the multi-purpose utility bag of FIG. 1 mounted to a leash.
Figure 5:
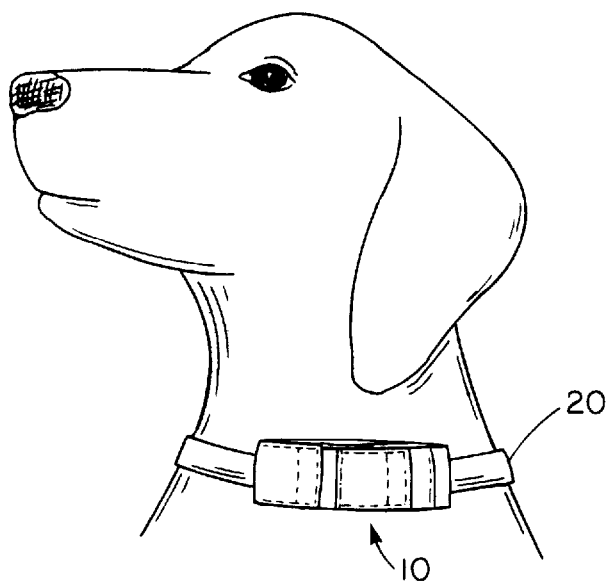
FIG. 5 is, in perspective view, the multi-purpose utility bag of FIG. 1 mounted to a pet collar.
Figure 6:
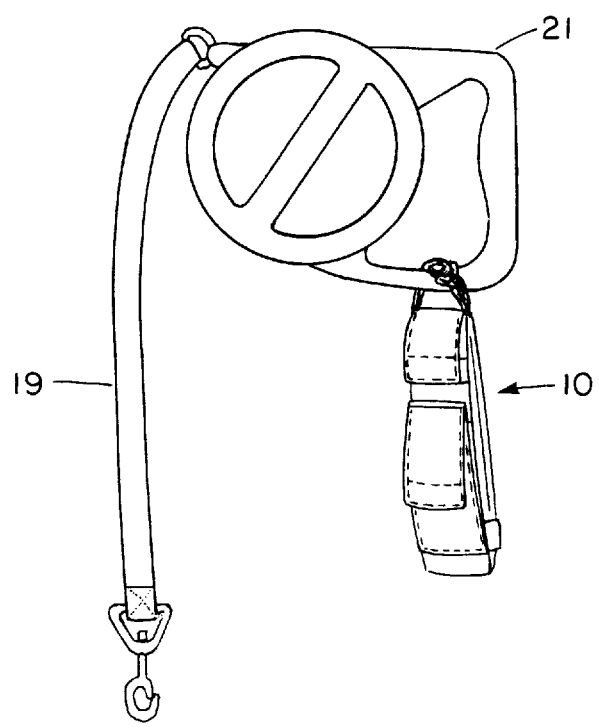
FIG. 6 is, in perspective view, the multi-purpose utility bag of FIG. 1 mounted to a handle of a retractable leash.

Nylon snap ring 15a and corresponding nylon ring 15b are provided for releasable fastening of the uppermost end of sleeve 12 to, for example, the handle of a dog leash 19 such as illustrated in FIG. 4. Releasable fastening is accomplished by passing nylon snap ring 15 through the looped handle 18 of the dog leash 19, and nylon snap ring 15a then clipped onto nylon ring 15b. Releasable fastening of the upper end of sleeve 12 in this fashion also operates to releasably fasten the upper end of sleeve 12 to pet collars 20 as seen in FIG. 5, to the handle 21 of retractable pet leashes as seen in FIG. 6, and to belt loops, belts, handbags, etc. (not shown).

Nylon strap 22 is provided at the lower end of sleeve 12, and is mounted across sheet 12a, for example, by sewing the ends of the nylon strap into the seams between sheets 12a and 12b, so as to be disposed laterally across the back of utility bag 10. Strap 22 provides a loop through which dog leash 19, collar 20, a belt, or the like, may be passed to thereby releasably secure both upper and lower ends of sleeve 12 of utility bag 10 to a carrying medium.

In one preferred embodiment, sleeve 12, that is, sheets 12a and 12b, and flap 12c are formed from one elongate strip of material. Sheets 12a and 12b formed by folding the elongate over onto itself, leaving enough material protruding from the fold at one free end of the elongate strip so as to form flap 12c.

Although the preferred embodiments illustrated and described are of a rectangular shape, it is within the scope of the invention to provide a sleeve 12 or pocket 14 having other than a rectangular shape. Sleeve 12 could be of any aesthetically pleasing shape, although preferably elongate, so long as items such as plastic bags may be stored therein.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A utility bag comprising an elongate flexible sleeve having an upper end and a lower end and front and back sides extending between said upper and lower ends, said upper end having a first aperture therein for access to a first cavity defined by said front and back sides and said lower end whereby articles may be placed through said first aperture into and removed from said first cavity, a flexible releasably securable flap provided at said first end of said sleeve for releasable closure of said first aperture, at least one flexible expandable pocket mounted externally to said front side of said sleeve and expandable by pocket expansion means, whereby access may be had to a second cavity within said expandable pocket when said first cavity is full of material being carried and said sleeve is thereby firmly cylindrical, said first and second cavities for storing small articles therein, said expandable pocket having thereon a second releasably securable flap for releasably closing a second aperture for access to said second cavity, mounting means at said upper and lower ends of said sleeve for releasable mounting of said utility bag to an elongate member wherein said mounting means at said upper end of said sleeve is a diametrically opposed pair of flexible first and second members mounted to said upper end of said sleeve, a clip mounted to said first member, said first and second members of corresponding first and second lengths extending from said upper end of said sleeve so as to allow releasable fastening of said clip to said second member when distal ends of said first and second members are flexed into opposed facing relation whereby said first and second members may be releasably fastened around an object to thereby releasably fasten said upper end to said object and wherein said mounting means at said lower end of said sleeve is flexible third member disposed laterally across said back side and mounted at its ends to said lower end of said sleeve so as to be generally flush across said back side.

2. The device of claim 1 wherein said flexible third member is a flexible strap mounted so as to lie flush against said back side.

3. The device of claim 2 wherein said flexible strap extends entirely across said back side and is mounted to said sleeve in a seam between said front and back sides.

4. The device of claim 2 wherein said first and second members are first and second flexible loops.

5. The device of claim 4 wherein said flexible loops are mounted to said sleeve is a scam between said front and back sides.

6. The device of claim 5 wherein said clip is a spring clip, and wherein a ring is mounted to said second flexible loop for releasable engagement with said spring clip.

* * * * *

UNITED STATES PATENT AND TRADEMARK OFFICE
CERTIFICATE OF CORRECTION

PATENT NO : 5,890,637
DATED : April 6, 1999
INVENTOR(S) : FURNEAUX, Lloyd

It is certified that error appears in the above-identified patent and that said Letters Patent is hereby corrected as shown below:

Column 4, Line 31, after "is", insert --a--;

Column 4, Line 44, delete "in a scam" and insert --in a seam--.

Signed and Sealed this

Eighth Day of May, 2001

*Attest:*

NICHOLAS P. GODICI

*Attesting Officer*   Acting Director of the United States Patent and Trademark Office